United States Patent

Vermette

[15] 3,670,185
[45] June 13, 1972

[54] INDUSTRIAL TECHNIQUE

[72] Inventor: Clifford Vermette, Houston, Tex.

[73] Assignee: Schlumberger Technology Corporation

[22] Filed: April 15, 1970

[21] Appl. No.: 28,797

[52] U.S. Cl..............................307/304, 307/251, 307/255
[51] Int. Cl........................................................H03k 17/60
[58] Field of Search..................307/251, 255, 304, 279, 205

[56] References Cited

UNITED STATES PATENTS

| | | | |
|---|---|---|---|
| 3,077,545 | 2/1963 | Rywak | 307/255 X |
| 3,252,011 | 5/1966 | Zuk | 307/205 |
| 3,521,242 | 7/1970 | Katz | 307/279 X |
| 3,539,823 | 11/1970 | Zuk | 307/205 X |

Primary Examiner—John S. Heyman
Attorney—William R. Sherman, Ernest R. Archambeau, Jr., Stewart F. Moore, Michael J. Burger and Edward M. Roney

[57] ABSTRACT

An illustrative embodiment of the invention relates to a circuit for a nuclear magnetic logging tool in which two sets of two parallel connected field effect transistors (FET), are coupled to respective gate voltages that are of equal magnitude and of opposite polarity. During polarization, the FETs are in a low impedance condition to avoid being subjected to large voltages. The method of biasing, together with the parallel connection of the FETs ensures symmetrical voltages with respect to ground across the coil. At the end of polarizing, the coil voltage reverses causing conduction to occur in a Zener diode which is connected across the coil. When the reverse voltage of the coil drops below a predetermined level, the Zener diode stops conducting and the circuit rings at its resonant frequency for a few milliseconds. To further reduce the charge in the circuit, a low value critical damping resistance is applied across the coil through another field effect transistor. After most of the stored charge has been dissipated, both FET sets are switched to a high impedance state in order to apply the formation fluid nuclear magnetic resonance signal to the downhole amplification system input.

3 Claims, 1 Drawing Figure

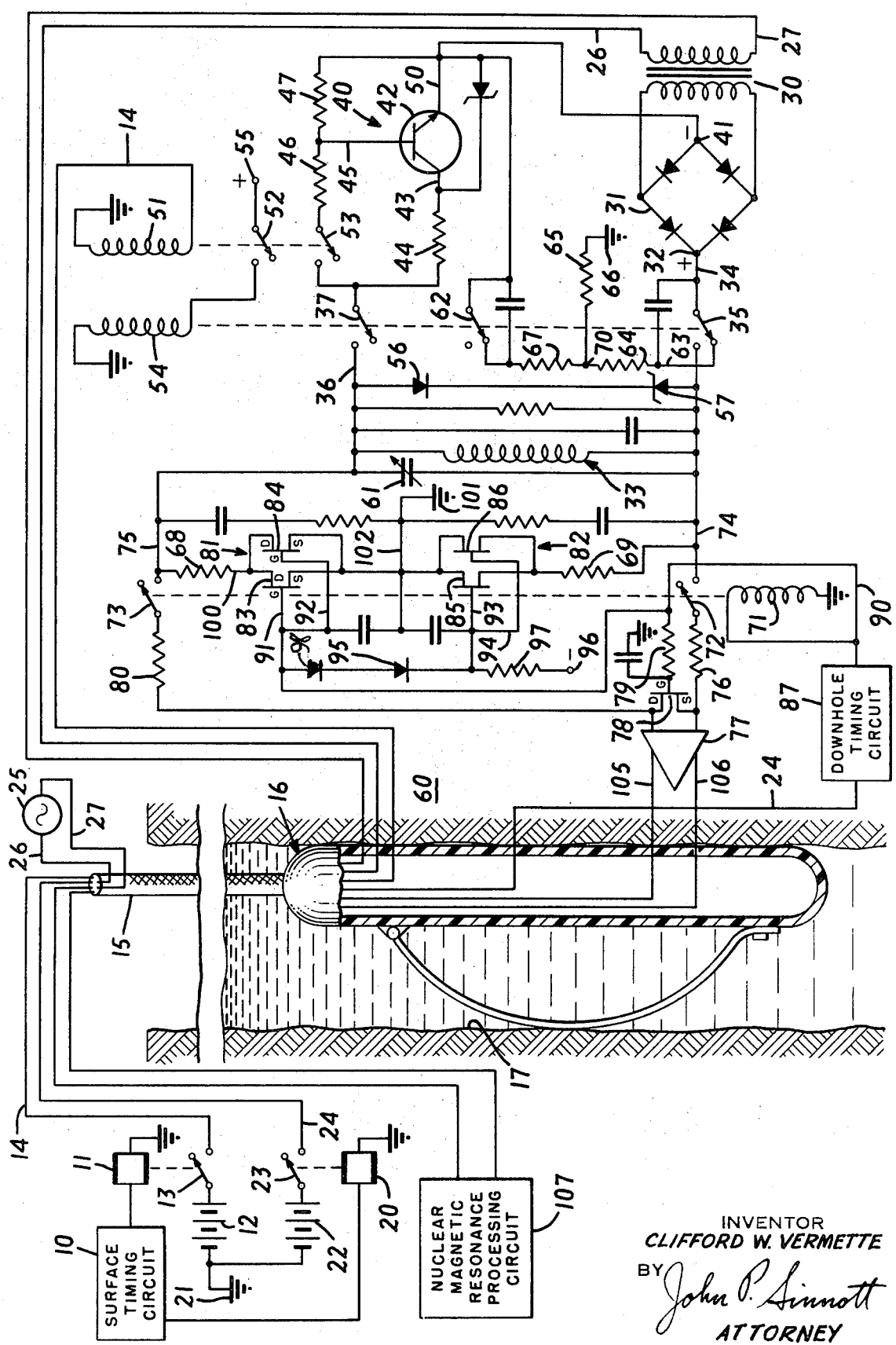

INDUSTRIAL TECHNIQUE

BACKGROUND OF THE INVENTION

1. Field of the Invention

This invention relates to circuits for reducing transient signals and more particularly, to an FET switching circuit that minimizes the influence of transient charge pulses in nuclear magnetic borehole logging tools, and the like.

2. Description of the Prior Art

Quantitative information about the character of the hydrogenous fluids that often are found in earth formations is needed by the oil industry in order to identify the most promising oil well production "horizons," or depths. Frequently, data of this sort is acquired through "logging tools" or "sondes." These tools often comprise fluid tight instrument packages that are lowered into a well or a borehole that has been drilled through one or more earth formations with oil-bearing potential. As the tool is drawn upwardly through the formation, it measures the porous volume, the electrical characteristics and other qualities of each stratum under observation.

For example, the "free fluid index" is a particularly useful parameter that provides a measure of the hydrogenous fluid that actually can be extracted from a formation.

This free fluid index usually is acquired through a logging technique known as "nuclear magnetic logging." In this technique, a polarizing coil within a logging sonde applies a strong magnetic field to the earth formation. Because the hydrogen nucleus has a magnetic polarity, the applied field causes the magnetic moments of the protons that are in a liquid or gaseous state in the formation to align with the polarizing field. After a few seconds, the polarizing field is terminated abruptly and the coil is allowed to resonate or "ring" at a frequency that tends to suppress undesirable responses from the protons in the borehole fluid. After the ringing is stopped, a short interval is provided to dissipate electrical transients in the tool circuits caused by switching, stray charges, and the like.

Thus conditioned, an alternating current of decreasing amplitude is induced in the polarizing coil. This induced current is caused by the precession of the polarized "free" protons in the earth formation about the direction of the earth's magnetic field, much in the way in which a spinning top will precess about the direction of the earth's gravitational field. The initial amplitude of the induced current and the time required for the induced signal to decay can be processed for further analysis and interpretation in terms of the free fluid index of the hydrogenous material within the earth formation under observation. A detailed description of a typical system for measuring this parameter is described in J. H. Baker, Jr. U.S. Pat. No. 3,483,465 granted on Dec. 9, 1969 for "Nuclear Magnetism Logging System Utilizing an Oscillated Polarizing Field."

The downhole circuits switching the polarizing, ringing and induced currents to and from the coil are under a great burden because the switching times are so short and the induced precession signal is so very weak. Transient signals and noise, moreover, that accompany electrical switching operations often distort or even destroy the induced proton signal.

In this connection, it has been found that the field effect transistor — or FET — generates relatively less undesirable electrical noise during switching than conventional junction or bipolar transistors. The FET is distinguished from the ordinary junction transistor in that the FET controls current flow through electrical fields established in a "gate" electrode rather than through direct electrical "carrier" injection at the junction.

The gate electrode, which regulates the current flow between the FET source and drain electrodes through the application of an appropriate field potential may bias or "pinch" off this current flow. Current leakage during pinch-off is much less than the leakage currents that characterize the analogous "biased-off" condition in an ordinary bipolar transistor. (The FET, moreover, exhibits a much higher input impedance during operation than conventional transistors).

Although all of these FET features are desirable for nuclear magnetic logging purposes, there are some subtle inadequacies that prevent these devices from being directly applied to the solution of the electrical noise problem in nuclear magnetic logging tools. For example, depending on the gate-to-source voltage and the drain characteristics of the device in question, it is possible for an FET to be in a relatively high impedance ON condition. Heating the FET while it is in this state, further increases its impedance and thereby leads to a runaway condition in which the voltage drop across the FET may be as great as 20 volts. If one of two series connected FET's is in this state, and connected across the polarizing coil, a large voltage asymmetry with respect to ground appears across the tuned coil circuit. An asymmetry remains even after most of the charge stored in the tuned circuit has been dissipated. Consequently, a large transient appears upon opening the circuit to the input amplifiers. The latter transient can obliterate the signal for 15 msec. or more. Thus, a pair of FETs, connected in series to the polarizing coil, are likely, in the usual high temperature borehole environment, to produce this undesirable transient. This situation is further aggravated through the usual non-uniform temperature distribution in the logging tool which frequently establishes somewhat different thermal environments for the individual FETs.

A need exists for a technique that will adapt the desirable leakage, switching, noise and impedance characteristics of the FET to a nuclear magnetic logging tool in a way that eliminates or significantly reduces adverse thermal effects caused by the extreme environmental conditions encountered during well logging.

SUMMARY

In accordance with the invention, the electrical transient caused by individual differences in FET conducting or "on" impedance as a function of temperature is effectively eliminated through the use of two properly biased sets of FET's, in which each set is comprised of at least two parallel-connected FETs.

This novel circuit arrangement takes advantage of the hitherto undesirable irregularity in temperature response among FETs of the same type. For example, as the environmental temperature increases, the on impedance of one of the parallel-connected FETs changes a different amount than the on impedance of the other FET in the pair. The parallel connection enables the temperature response differences between the two devices to produce an average low on impedance that generally matches the average temperature-impedance characteristic of a similar parallel connected pair.

Biasing the gate electrodes in each of these sets to potentials of opposite polarity and equal absolute magnitude, produces a very low on impedance. This equalized impedance substantially reduces amplifier transient pulses caused by the asymmetrical voltage from either side of the sonde coil to ground. This improved result is established, moreover, in spite of environmental temperature differences for the individual FETs.

More particularly, direct current is coupled to the polarizing coil for about 2 seconds in order to insure that as many of the freely movable protons in the formation as possible are polarized by the applied field. A "cut-off" signal deactivates a relay that opens the circuit for the polarizing current and disconnects the coil from the power supply.

In this situation, the electrical polarity of the voltage that was developed across the polarizing coil is reversed and establishes a current that is dissipated through a Zener diode until the coil voltage drops to a predetermined level that is established through the diode characteristics. This voltage is chosen in order to initiate a resonating current, or ringing, in the coil that has an amplitude sufficient to establish an oscillating magnetic field.

The coil is tuned to resonate at a frequency that matches the Larmor frequency or natural precession frequency of the protons in the borehole. The purpose of this resonant condition is to suppress or eliminate noise signals that might overwhelm the sought-after, but less intense signal from the fluids within the formation. The Larmor frequency for a particular borehole condition can be measured by taking a water sample from the well and measuring the precession signal of the specimen with a magnetometer. A typical magnetometer for use in connection with the invention is described in J. A. Staples, III U.S. Pat. No. 3,469,181 granted on Sept. 23, 1969 for "Nuclear Magnetometer with Measurement Sequencing System."

To enable the coil to resonate, two sets of FETs, each comprising a pair of parallel connected FETs, are coupled from a common ground through individual resistances to respective ends of the polarizing coil. During polarization and ringing, the two sets of oppositely poled FET's are in a low impedance condition, thereby completing the circuit. In order to terminate the ringing at the end of a few cycles, the sets of FETs are bypassed or shunted down through another FET that is connected to the coil through a low resistance that critically damps the coil resonance.

After the ringing current has dissipated along with other stray charges in the polarizing system, the sets of FETs are switched to a high impedance condition. The FET sets thus disconnect the polarizing coil from the path to ground and pass the precession signal induced in the coil by the formation protons to the downhole amplifier system.

As hereinbefore mentioned, the induced alternating current is coupled to the downhole amplifier without introducing a significant voltage asymmetry and thereby minimizing a source of undesirable transients. This improved performance effectively eliminates the amplifier noise pulse attributable to the lack of symmetry that has characterized the prior art.

The amplifier in the sonde responds to this precession signal by converting the low amplitude input current into a signal suitable for transmission through the logging cable to the earth's surface. On the surface the signal is processed into a form suitable for formation analysis, e.g., the free fluid index.

For a better understanding of the present invention together with other and further objects thereof, reference is had to the following description taken in connection with the accompanying drawing, the scope of the invention being pointed out in the appended claims.

DESCRIPTION OF THE DRAWING

The sole FIGURE of the drawing shows a schematic diagram of an exemplary circuit for a nuclear magnetic logging apparatus in accordance with principles of the invention.

DESCRIPTION OF THE PREFERRED EMBODIMENT

As shown in the drawing, an exemplary embodiment of the invention comprises a surface timing circuit 10 that regulates the operation of a polarizing signal control relay 11. In response to signals from the surface timing circuit 10, the relay 11 selectively completes a circuit through battery 12, operated contacts 13 and a conductor 14 in an armored cable 15. The armored cable 15 preferably, is a multiconductor cable in which the individual conductors are insulated from each other. Ordinarily, this cable is used to lower and raise a logging sonde 16 formed of a non-magnetic material, of which epoxy resin cement bonded fiber glass is typical, through a borehole 17.

The surface timing circuit 10 also regulates the operation of an induced signal control relay 20. The induced signal control relay 20 transmits control signals to the logging sonde 16 through a path that includes ground 21, a battery 22, operated relay contacts 23 and a conductor 24 in the armored cable 15.

An alternating current generator 25, also on the earth's surface, sends power through cable conductors 26 and 27 to the sonde 16 in order to provide the power needed to operate the logging tool in a manner subsequently described. Thus, for example, downhole, the alternating current power from the generator 25 is applied through a transformer 30 to a diode bridge 31 in order to provide full wave rectification for the input power and establish a direct current supply needed for tool operation.

Direct current of positive polarity is drawn from terminal 32 of the bridge 31 for application to a polarizing coil 33, through a path that includes a conductor 34, operated relay contacts 35, the coil 33, a conductor 36, operated relay contacts 37 and switch means 40 to a negative polarity terminal 41 on the diode bridge 31. A typical polarizing coil for a nuclear magnetic logging tool of the type under consideration, is described in more complete detail in U.S. Pat. No. 3,538,429 granted Nov. 3, 1970 to John H. Baker, Jr. for "Coil Assembly for Nuclear Magnetism Well Logging."

Illustratively, the switch means 40 includes a bipolar NPN transistor 42 that controls the flow of current from operated relay contacts 37 through a path that includes collector electrode 43, collector resistance 44 and emitter electrode 50 to the negative terminal 41 of the diode bridge 31. Base circuit 45 of the transistor 42 is connected between voltage divider resistors 46 and 47. The resistor 47 is connected, moreover, between the base circuit 45 and emitter circuit 50 of the transistor 42 while the resistor 46 is connected between the base electrode 45 and the collector 43 through switch contacts 53.

In order to selectively activate and deactivate the transistor 42, and thereby respectively to complete or to interrupt the circuit for the polarizing current, downhole polarization relay 51 responds to signals initiated on the earth's surface through the operation of the control relay 11. Thus for instance, in response to a signal from the aforementioned timing circuit 10, the relay 11 is energized to operate the contacts 13 and complete the circuit through the conductor 14 in the cable 15 that energizes the windings of the downhole relay 51. When the relay 51 is energized, it operates contacts 52 and 53. The contacts 52 complete a circuit for a slave relay 54. This relay circuit includes a path from a power supply 55, through the operated contacts 52 and the windings of the relay 54 to a common ground. When energized in response to the control signal, the relay 51 also completes the base circuit for the transistor 42 through the voltage divider resistance 46, the operated relay contacts 53, and the collector resistance 44. Meanwhile, the energized slave relay 54 also operates the contacts 35 and 37 to complete the polarizing coil circuit as hereinbefore described.

The magnetic field established by the polarizing coil 33 forces the magnetic moments of most of the "free" protons to align their respective magnetic poles with the applied field. When this alignment is attained, the polarizing field is terminated. The switch means 40 is disabled in order to discontinue the polarizing field. For example, at the end of the polarization period, the timing circuit deenergizes the relay 11 and disables the contacts 13 in the conductor 14 and causes first downhole relay 51 to release and then the relay 54 to release. The transistor 42 is deactivated through the now disabled base circuit contacts 53. This abruptly disconnects the polarizing coil 33 from the direct current available at the diode bridge 41. Thus, because the release of the slave relay 54 is slightly delayed, the contacts 35 and 36 are disabled only after the transistor 42 has switched into an high impedance and established an open polarizing circuit condition. In this way, relay arcing is avoided and the electrical noise that ordinarily accompanies relay contact operation with relatively high currents is eliminated.

When the polarizing current is disconnected from the polarizing coil 33, the voltage across the coil 33 reverses and current flows through a diode 56 and a Zener diode 57.

The diodes 56 and 57 rapidly dissipate the energy stored in the coil 33 until the coil voltage decreases to a point below the "breakdown" voltage for the Zener diode 57. When breakdown voltage is reached, the Zener diode 57 stops conducting and causes the current in the coil to resonate at the predetermined Larmor frequency that characterizes the protons in the borehole fluid. It will be recalled in this regard, that the Larmor frequency of the borehole protons can be measured from a water sample with the aid of a magnetometer. The resonance magnetic field established by the ringing current in the coil 33 tends to disorient the borehole protons in order to better observe the precession signal from the protons in the formation fluids.

The coil is tuned to match the proton Larmor frequency before the sonde 16 is lowered into the borehole 17 through an adjustment to a variable capacitor 61 that is connected in parallel with the coil 33. Ringing is sustained in the coil 33, moreover, only for a few cycles.

When the relay 54 releases, the relay contacts 35 and relay contacts 62 are operated to complete a low impedance circuit for the direct current from the bridge 31 through a path that includes the positive terminal 32 of the bridge, a conductor 63, a resistor 64, a resistor 65 and a common ground 66. The bridge terminal 41 is connected to the ground 66 through a portion of the emitter circuit 50, the operated relay contacts 62, a resistor 67, a junction 70 and the resistor 65.

To establish damping for the coil 33 during ringing, two resistances 68 and 69 are connected in parallel with the coil at the time the bipolar transistor switch means 40 is disabled. Typically, the surface timing circuit 10 energizes the relay 20 on the earth's surface to complete a circuit from the ground 21, through the battery 22, the operated contacts 23 and the conductor 24 to activate a downhole timing circuit 87.

The oppositely poled sets or pairs of FETs 81 and 82 continue to conduct after Zener conduction has terminated in order to connect the resistors 68 and 69 to the coil 33 and thus to permit the coil to ring for a few cycles. The path established through the damping resistors 68 and 69 during ringing, includes the coil 33, a conductor 75, the resistor 68, a drain circuit 100 of a pair of parallel connected FETs 83 and 84, a source circuit 102 for the FETs 83 and 84 and ground 101. The path from the other terminal of the polarizing coil 33 includes a conductor 74, the resistor 69, drain electrodes of parallel connected FETs 85 and 86, the source circuit 102 and the ground 101.

After a few milliseconds, the downhole timing circuit 87 enables an FET 78 to conduct and thereby apply critical damping to the coil 33 through the relatively low resistance that characterizes resistors 76 and 80. For example, to end ringing, the timing circuit 87 activates a downhole relay 71. The relay 71 operates contacts 72 and 73 to complete the circuit from the polarizing coil 33 through a path that includes the conductor 74, contacts 72, a resistor 76 of relatively low resistance vis-a-vis the resistor 69, source-to-drain circuit of a field effect transistor 78, a resistor 80 of relatively low resistance in contrast to the resistor 68, operated relay contacts 73 and the conductor 75 to the other terminal of the coil 33. The downhole timing circuit 87 also sends a gate enabling signal for the FET 78 through conductor 90. Because the electrical resistance of the resistors 76 and 80 is much lower than the parallel connected resistances 68 and 69, the ringing current from the coil 33 is preferentially shunted through and dissipated in these lower value resistors when the FET 78 is enabled to conduct current. When the ringing current and stray charges have been dissipated in the foregoing manner, the downhole timing circuit 87 biases off the oppositely poled pairs of FETs 81 and 82 as well as the FET switch means 78.

In accordance with an aspect of the invention, the FET sets 81 and 82 which includes the parallel connected FETs 83 and 84 in the pair 81, and the parallel connected FETs 85 and 86 in the pair 82 appear to establish, in each of the sets 81 and 82, average impedance during polarization that are low and almost equal. This feature of the invention is in sharp contrast to the diverse drain characteristics that typifies the temperature response of individual FETs of the same type. Thus, in accordance with the invention not only are the low current leakage, low noise and swift cut-off characteristics of the FET made available to a nuclear magnetic logging device, but also a bilaterally symmetrical impedance characteristic is achieved in order to prevent the development of a signal-destroying noise pulse in a downhole amplification circuit 77.

In passing, it should be noted that the downhole timing circuit 87 biases the gate electrodes of the FETs 83, 84, 85 and 86 into a non-conducting condition through a path that includes the conductor 90, parallel gate electrodes 91 and 92, individual to the FETs 83 and 84, respectively, and gate electrodes 93 and 94 for the respective FETs 85 and 86. Two diodes 95 and 98 are interposed in the circuit between the gate electrodes 91 and 92 and the oppositely poled gate electrodes 93 and 94. The electrodes 93 and 94, moreover, are connected to a negative voltage supply 96 through a resistance 97. This biasing arrangement for the FET sets 81 and 82, in which, for instance, the gates for the FET set 81 is biased at + 0.6 v with respect to ground during conduction while the gates of the FET set 82 are biased at −0.6 v through the two diodes 95 and 98, the resistance 97 and the negative potential 96 provides a much lower on impedance than the prior art technique of biasing both sets of FET gates to the same positive potential.

At the same time as the FET sets 81 and 82 are biased off, it will be recalled that the FET 78 is also switched into an high impedance state. Consequently, the alternating signal induced in the coil 33 by the magnetic fields of the precessing protons in the formation fluid is coupled to the amplifier 77 with a minimum transient level. The induced precession signal is coupled to the amplifier 77 through a circuit that includes the polarizing coil 33, the conductor 75, the operated relay contacts 73, the resistor 80, the amplification circuit 77. The other terminal of the coil 33 is coupled to the amplifier 77 through the conductor 74, the operated relay contacts 72 and the resistor 76.

Amplified precession signals are sent to the earth's surface from the downhole amplification circuit 77, through conductors 105 and 106 to a nuclear magnetic resonance processing circuit 107. On the earth's surface, the signals are processed as described in the aforementioned Baker, Jr. patent in order to produce a log, for example, of the free fluid index or the decay time of the precessing protons within the earth formation 60.

I claim:

1. In a circuit having an inductor and means coupled to the inductor for changing the magnitude of the impedance across the terminals of the inductor, the combination of,
    two sets of field-effect transistors, each set having at least two field-effect transistors therein, the field-effect transistors in each set having first and second electrodes and a gate electrode, the first, second and gate electrode of each field-effect transistor in each set of field-effect transistors being coupled respectively to the first, second and gate electrode of the other field-effect transistors in the set, the second electrodes of one set of field-effect transistors being coupled to the second electrodes of the other set, and the first electrodes of each set of field-effect transistors being coupled to opposite terminals of said inductor.

2. The circuit of claim 1 wherein the first electrodes of each set of field-effect transistors are the drain electrodes and the second electrodes are the source electrodes.

3. The circuit of claim 2 wherein the gate electrodes of one of the sets of the field-effect transistors are coupled to a first voltage source having a first polarity and the gate electrodes of the other set of the field-effect transistors are coupled to a second voltage source having a magnitude equal to that of the first voltage source and having a polarity opposite to that of the first voltage source during the time that the two sets of the field-effect transistors are in the ON condition.

* * * * *